US007818136B2

(12) United States Patent
Chen et al.

(10) Patent No.: US 7,818,136 B2
(45) Date of Patent: Oct. 19, 2010

(54) PORTABLE ELECTRONIC DEVICE CAPABLE OF RE-CALIBRATING AZIMUTH AND METHOD THEREOF

(75) Inventors: Tsan-Yuan Chen, Taoyuan County (TW); Yu-Peng Lai, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 90 days.

(21) Appl. No.: 12/336,550

(22) Filed: Dec. 17, 2008

(65) Prior Publication Data

US 2009/0171607 A1 Jul. 2, 2009

(30) Foreign Application Priority Data

Dec. 27, 2007 (TW) .............................. 96150610 A

(51) Int. Cl.
*G01C 17/38* (2006.01)
(52) U.S. Cl. ................... 702/92; 324/202; 340/686.1; 702/85
(58) Field of Classification Search ............ 702/85, 702/92–95; 701/220, 224; 340/815.4; 33/356; 342/352; 324/202
See application file for complete search history.

(56) References Cited

U.S. PATENT DOCUMENTS 7,210,236 B2* 5/2007 Sato et al. ..................... 33/356
7,324,906 B2* 1/2008 Sato et al. ..................... 702/85
2008/0309508 A1* 12/2008 Harmon .................. 340/686.1

FOREIGN PATENT DOCUMENTS

EP          1 605 232 A2   12/2005
WO        2007148247 A1   12/2007

* cited by examiner

*Primary Examiner*—John H Le
(74) *Attorney, Agent, or Firm*—Winston Hsu; Scott Margo; Min-Lee Teng

(57) ABSTRACT

One or more sensors in a portable electronic device have individual status parameter in response to different using configurations. When the portable electronic device operates in a first using configuration, an electronic compass in the portable electronic device loads a corresponding first default setting, according to the status parameter of the sensors operated in the first using configuration, and detects the geomagnetic field for outputting azimuth data. When the portable electronic device changes its configuration from the first using configuration to a second using configuration, the electronic compass stops detecting the geomagnetic field and loads a corresponding second default setting, according to the status parameter of the sensors operated in the second using configuration, and detects the geomagnetic field for outputting azimuth data. The electronic compass is capable of properly detecting the geomagnetic field by loading different default settings when facing interference of different magnetic fields.

9 Claims, 3 Drawing Sheets

PORTABLE ELECTRONIC DEVICE CAPABLE OF RE-CALIBRATING AZIMUTH AND METHOD THEREOF

BACKGROUND OF THE INVENTION

1. Field of the Invention

The application relates to a portable electronic device and azimuth calibration method, and more specifically, to a portable electronic device having a magnetic detector and azimuth calibration method thereof that are capable of calibrating the measurement of azimuth according to different setting.

2. Description of the Prior Art

The advancement of integrated circuit and technology of electro-mechanical integration has led to the multiplicity of electronic products functioning as navigation and positioning. In such field, electronic compass provides with what a traditional compass can do for personal portable devices such as car navigators, flying navigation, etc. One example of an electronic compass provides azimuth data, which can be presented by the angle change between the geomagnetic north and the target, as the main guidance. The magnetic field sensor compass usually has one or more magnetometers, a magnetic element capable of detecting a magnetic field, for detecting the surrounding geomagnetic field and provides guidance.

For most portable devices such as a personal digital assistant (PDA), a mobile phone, a smart phone, a global positioning system (GPS) that has pointing and/or navigating functions and has its electronic compass configured at a certain location therein, the electronic compass must be calibrated for ensuring the precision when detecting the geomagnetic field since the electronic compass is easily effected by the combination of surrounding magnetic field, including the geomagnetic field and other magnetic fields induced by electrical components of the portable device. The electronic compass then performs its detection of geomagnetic field and outputs the azimuth data based on a calibrated default setting. The portable device mentioned above, however, has more and more different using configurations according to different operational modes and needs, vertical slide-out and lateral slide-out for the slider phone or the smart phone or open-and-close for the clamshell phone. Each different configuration changes the disposition of every electrical component inside the portable device and changes the combinational magnetic field around the electronic compass. The precision of detection the azimuth of the electronic compass will be biased hereinto.

SUMMARY OF THE INVENTION

The application provides a calibration method of detecting azimuth, which is applied on a portable electronic device that comprises a magnetic detector and a sensor where the magnetic detector is utilized for detecting a first magnetic field and outputting azimuth data and the sensor has a first status parameter and a second status parameter correspondingly when detecting the portable electronic device being operated in a first using configuration and in a second using configuration. The calibration method includes steps: loading a corresponding first default setting according to the first status parameter of the sensor for detecting the first magnetic field and outputting azimuth data; and when the sensor detects the second using configuration of the portable electronic device, loading a corresponding second default setting according to the second status parameter of the sensor for detecting the first magnetic field and outputting azimuth data.

The application also provides a portable electronic device capable of calibrating azimuth data. The portable electronic device includes a housing capable of selectively setting the portable electronic device in at least a first using configuration or a second using configuration, a magnetic detector configured inside the housing for loading a first default setting or a second default setting for detecting the first magnetic field and outputting azimuth data, and a sensor configured inside the housing for having a first status parameter when the portable electronic device is set in the first using configuration and a second status parameter when the portable electronic device is set in the second using configuration. When the sensor detects change of using configuration of the portable electronic device, the magnetic detector is utilized for loading the corresponding default setting according to the status parameter of the sensor for detecting the first magnetic field and outputting azimuth data.

These and other objectives of the present invention will no doubt become obvious to those of ordinary skill in the art after reading the following detailed description of the preferred embodiment that is illustrated in the various figures and drawings.

DETAILED DESCRIPTION

According to the application, portable electronic devices such as personal digital assistant (PDA), mobile phone, smart phone, or global positioning system (GPS) that has navigating function can have different configuration based on different using mode. For example, the cover of a slider phone can have vertical or lateral slide-out configurations, the cover of a clamshell phone can be opened or further lying even by a design or dual axles, a detachable display of the portable electronic device has different using position, or the cover of the slider phone slides out laterally and further has a tilted configuration relative to the horizontal plane. Each different configuration of each portable electronic device causes different combination of magnetic field and corresponding default setting for the electronic compass is loaded and used by the electronic compass such that the electronic compass can quickly and precisely detects the geomagnetic field and output azimuth data based on appropriate default setting.

Figure 1:
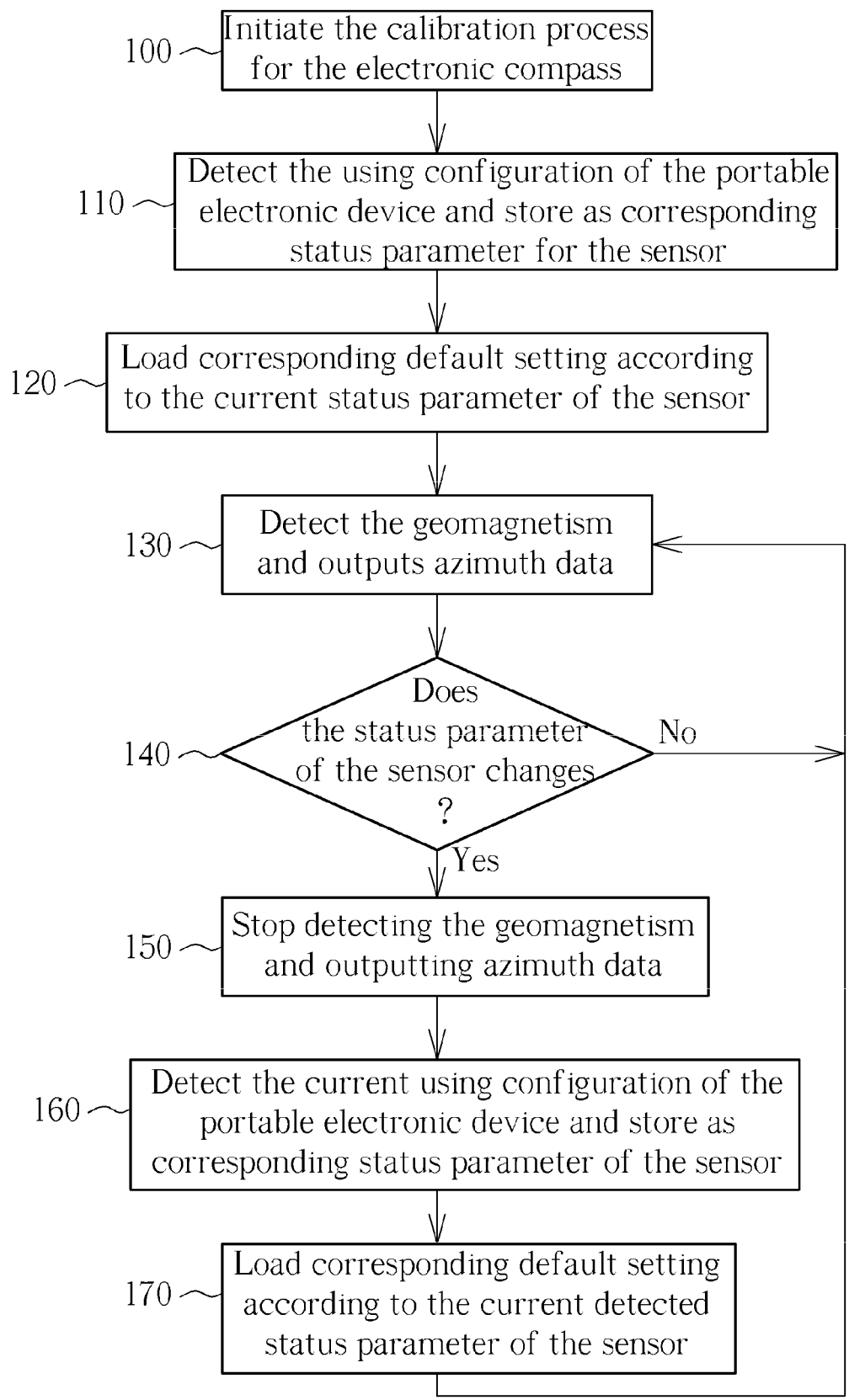
FIG. 1 is a flow chart of the calibration method of detecting azimuth according to different default setting disclosed in the preferred embodiment of the application.

Please refer to FIG. 1. FIG. 1 is a flow chart of the calibration method of detecting azimuth according to different default setting disclosed in a preferred embodiment of the application. The steps are as followed:

Step 100: initiate the calibration process for the electronic compass inside the portable electronic device;

Step 110: detect the using configuration of the portable electronic device and store as corresponding status parameter for the sensor;

Step 120: the electronic compass loads corresponding default setting according to the current status parameter of the sensor obtained in step 110;

Step 130: the electronic compass detects the geomagnetic field and outputs azimuth data;

Step 140: determine if the status parameter of the sensor changes because of different configuration of the portable electronic device; if the status parameter changes, execute Step 150, if the status parameter does not change, execute Step 130;

Step 150: the electronic compass stops detecting the geomagnetic field and outputting azimuth data;

Step 160: detect the current using configuration of the portable electronic device and store as corresponding status parameter of the sensor;

Step 170: load corresponding default setting according to the current detected status parameter of the sensor and execute Step 130.

Figure 2:
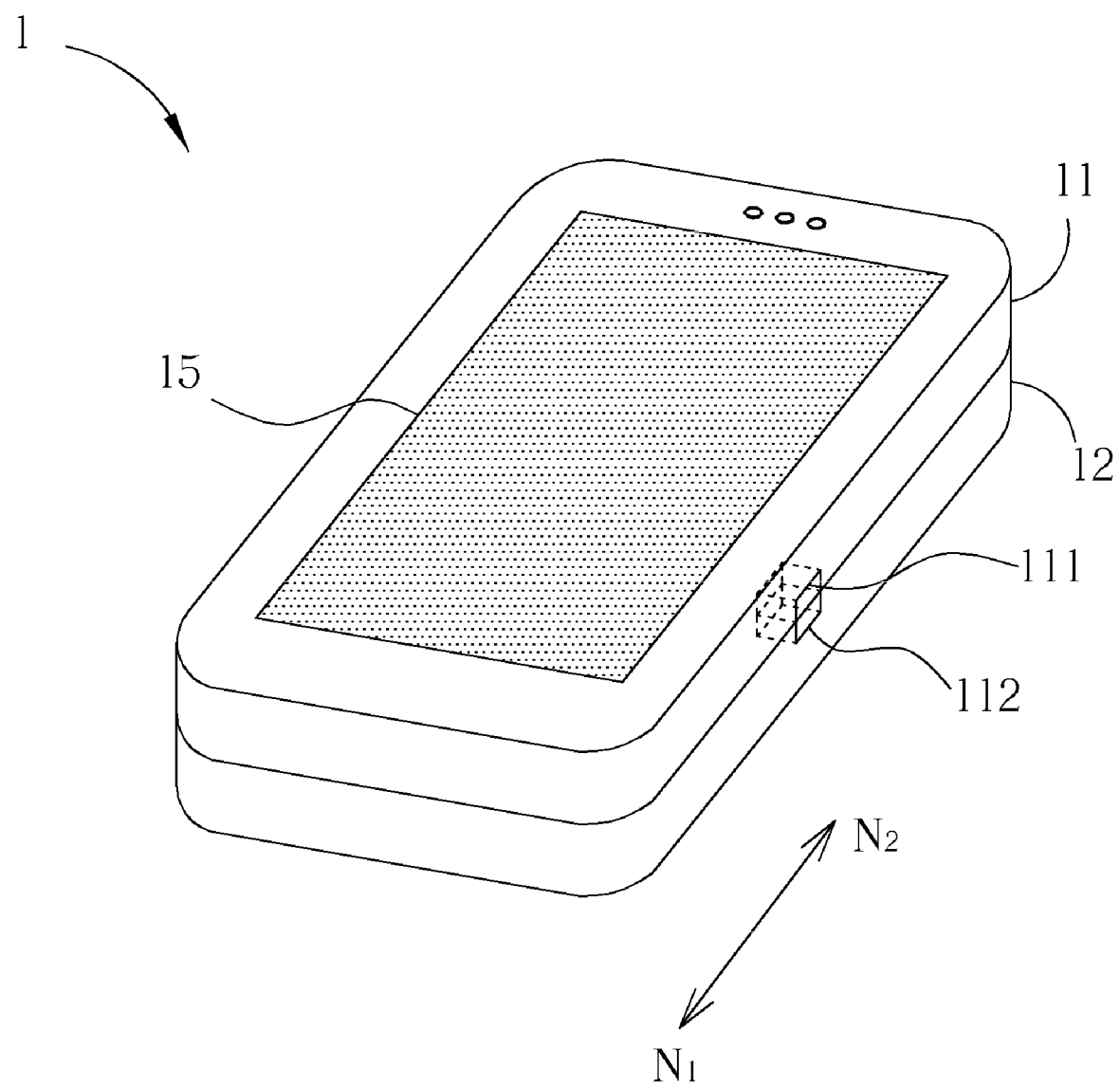
FIG. 2 is an illustration of a portable electronic device configured in a first using configuration.
Figure 3:
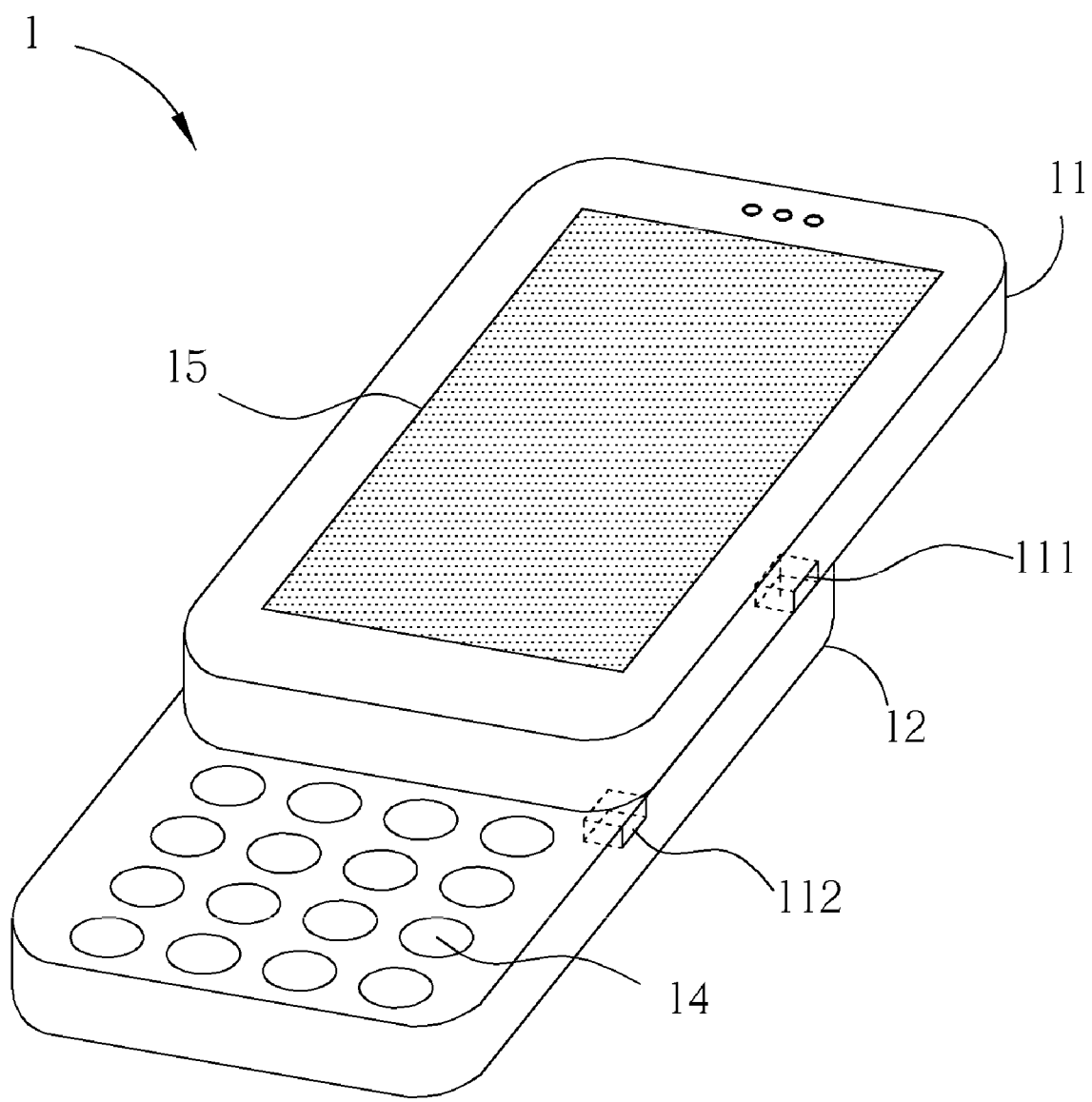
FIG. 3 is an illustration of a portable electronic device configured in a second using configuration.

Please also refer to FIG. 2 and FIG. 3. FIG. 2 is an illustration of a portable electronic device 1 configured in a first using configuration, for example, a close configuration of a slider phone. FIG. 3 is an illustration of the portable electronic device 1 configured in a second using configuration, or a slide-out configuration of a slider phone. The portable electronic device 1 can be a personal digital assistant (PDA), a mobile phone, a smart phone, or a global positioning system (GPS), and in the embodiment, also shown in FIG. 2 and FIG. 3, a smart phone is used for description. The portable electronic device 1 includes a first housing 11 and a second housing 12 that are capable of having relative slide vertically along direction N1 or direction N2. Horizontal relative sliding between the two housings is also configurable in the application. The portable electronic device 1 can therefore have different using configuration due to the relative movement of the two housings. The portable electronic device 1 also includes a keyboard 14 allowing for operating the portable electronic device 1 by inputting numbers, text, or control functions. A display 15 is configured on the first housing 11, which can be a touch screen, for displaying messages while the portable electronic device 1 is performing various kinds of functions, such as communication, personal note, navigating, and gaming. An electronic compass that is not shown in the figure is further configured inside the portable electronic device 1 for detecting the geomagnetic field and outputting azimuth data for the portable electronic device 1. Except for the electronic compass, the application can be also implemented on any magnetic detectors that are highly sensitive to any magnetic field change.

In a common sense, the electronic compass works under a normal situation that the electronic compass detects the geomagnetic field based on a predetermined default setting without interference of other abnormal magnetic field. Such default setting can be obtained after the electronic compass is calibrated by eliminating the effect of the combinational magnetic field induced by every electrical component inside the portable electronic device 1. Since different using configuration of the portable electronic device 1 results in different combinational magnetic field, the portable electronic device 1 in the application also includes a sensor 111 that is configured inside the first housing 111 as shown in the embodiment in FIG. 2 and FIG. 3. A trigger 112 is included in the second housing 12. When the portable electronic device 1 is set in the first using configuration as shown in FIG. 2, the sensor 111 faces the trigger 112, and the trigger 112 activates the sensor 111 such that the sensor 111 has been in a triggered status. When the portable electronic device 1 is set in the second using configuration as shown in FIG. 3, the trigger 112 is positioned away from the sensor 111, and does not activate the sensor 111 such that the sensor 111 has been in an un-triggered status. The structural and operational configuration of the sensor 111 and the trigger 112 in the figures and in the text shall not be construed as a limitation for the application. Anyone skilled in the art should be able to realize that any structural arrangement for the sensor 111, which can be operated to have a 'triggered' and an 'un-triggered' statuses based on different using configuration of the portable electronic device 1, and that electrical or mechanical operational implementation of the sensor 111 falls in the scope of the application.

For example, when the portable electronic device 1 is set in the first using configuration as shown in FIG. 2 and the electronic compass is initiated as in Step 100, the sensor 111 has a triggered status that is stored as a status parameter as in Step 110 for the sensor 111. The electronic compass then loads a first default setting from a built-in storage (Step 120) that corresponds to the first using configuration as a working setting for detecting the geomagnetic field and outputting azimuth data as shown in Step 130. The first default setting is obtained and stored in the portable electronic device 1 (Step 160) by first detecting the combinational magnetic field induced from every electrical components of the portable electronic device 1 locating under the first using configuration, and then the electronic compass is calibrated to have a working setting that can eliminate the effect of the combinational magnetic field.

When the portable electronic device 1 changes its using configuration, for example, from the first using configuration as shown in FIG. 2 to the second using configuration as shown in FIG. 3, the status of the sensor 111 changes accordingly from the triggered status as shown in FIG. 2 to the un-triggered status as shown in FIG. 3 (Step 140). The electronic compass can not normally work to detect the geomagnetic field and output azimuth data under the condition of using the first default setting. The portable electronic device 1 stops the electronic compass from detecting the geomagnetic field and outputting azimuth data accordingly (Step 150). The electronic compass then loads a second default setting from the built-in storage inside the portable electronic device 1 that corresponds to the second using configuration as a working setting for detecting the geomagnetic field and outputting azimuth data as shown in Step 130 since the portable electronic device 1 is now in the second using configuration and the sensor 111 is set in the un-triggered status. The second default setting is obtained and stored in the portable electronic device 1 (Step 160) by first detecting the combinational magnetic field induced from every electrical components of the portable electronic device 1 locating under the second using configuration, and then the electronic compass is calibrated to have a working setting that can eliminate the effect of the combinational magnetic field. In such way, the portable electronic device 1 disclosed in the application loads corresponding default setting that is pre-stored in the device according to the result of calibration of the electronic compass under different using configuration so that the electronic compass can quickly and normally detect the geomagnetic field and output azimuth data when the combinational magnetic field changes under different using configuration.

Additionally, in the application, the changed status of the sensor 111 is stored as the status parameter for the sensor 111 directly after the sensor 111 detects any change in using configuration for the portable electronic device 1, which means that Step 160 can also be performed after Step 140. The sensor 111 can be in the form of mechanical switch or electrical element such as a light sensor or a magnetic sensor. For example, a mechanical switch sensor 111 can be pushed by the trigger 112 and set in the triggered status when the portable electronic device 1 is in the second using configuration.

On the other hand, for portable electronic device 1 that has more than two different using configurations, like a smart phone that has vertical slide-out configuration, lateral slide-out configuration, and standing cover configuration after laterally sliding out, disposition for more than one sensor in the device is also achievable in the application. The electronic compass can load corresponding default setting for detecting the geomagnetic field according to the combination of the triggering status of each sensor.

The portable electronic device in the application has different configuration in different operational mode. One or more sensors have individual status parameter in response to each using configuration. When the portable electronic device operates in a first using configuration, the electronic compass in the portable electronic device loads a corresponding first default setting, according to the status parameter of the sensors operated in the first using configuration, and detects the geomagnetic field for outputting azimuth data. When the portable electronic device changes its configuration from the first using configuration to a second using configuration, the electronic compass stops detecting the geomagnetic field and loads a corresponding second default setting, according to the status parameter of the sensors operated in the second using configuration, and detects the geomagnetic field for outputting azimuth data. The electronic compass is capable of properly detecting the geomagnetic field by loading different default settings when facing interference of different magnetic fields.

Those skilled in the art will readily observe that numerous modifications and alterations of the device and method may be made while retaining the teachings of the invention.

What is claimed is:

1. A calibration method of detecting azimuth, which is applied on a portable electronic device that comprises a magnetic detector and a sensor where the magnetic detector is utilized for detecting a first magnetic field and outputting azimuth data, and the sensor has a first status parameter and a second status parameter correspondingly when detecting the portable electronic device being operated in a first using configuration and in a second using configuration, the calibration method comprising steps:

the magnetic detector loading a corresponding first default setting according to the first status parameter of the sensor for detecting the first magnetic field and outputting azimuth data; and when the sensor detects the second using configuration of the portable electronic device, the magnetic detector loading a corresponding second default setting according to the second status parameter of the sensor for detecting the first magnetic field and outputting azimuth data;

wherein the first using configuration and the second using configuration of the portable electronic device are structural configurations of the portable electronic device.

2. The calibration method of claim 1, further comprising: the sensor detecting the using configuration of the portable electronic device and storing as a corresponding status parameter of the sensor.

3. The calibration method of claim 1, further comprising: when the sensor detecting change of using configuration of the portable electronic device, the magnetic detector temporarily stopping detecting the first magnetic field and outputting azimuth data.

4. The calibration method of claim 1, wherein the magnetic detector detecting the first magnetic field and outputting azimuth data is detecting the geomagnetic field and outputting azimuth data.

5. A portable electronic device capable of calibrating azimuth data, comprising:

a housing capable of selectively setting the portable electronic device in at least a first using configuration or a second using configuration, wherein the first using configuration and the second using configuration of the portable electronic device are structural configurations of the portable electronic device;

a magnetic detector configured inside the housing for loading a first default setting or a second default setting for detecting the first magnetic field and outputting azimuth data; and a sensor configured inside the housing for having a first status parameter when the portable electronic device is set in the first using configuration and a second status parameter when the portable electronic device is set in the second using configuration;

wherein when the sensor detects change of using configuration of the portable electronic device, the magnetic detector is utilized for loading the corresponding default setting according to the status parameter of the sensor for detecting the first magnetic field and outputting azimuth data.

6. The portable electronic device of claim 5, wherein the first magnetic field is geomagnetic field.

7. The portable electronic device of claim 5, wherein the magnetic detector is further utilized for temporarily stopping detecting the first magnetic field and outputting azimuth data when detecting change of using configuration of the portable electronic device.

8. The portable electronic device of claim 5, wherein the sensor is a mechanical sensor or an electrical sensor.

9. The portable electronic device of claim 5, wherein the magnetic detector is an electronic compass.

* * * * *